(12) United States Patent
Cho et al.

(10) Patent No.: US 12,496,268 B2
(45) Date of Patent: Dec. 16, 2025

(54) ANTI-AGING AND ANTIOXIDANT COSMETIC COMPOSITION CONTAINING BROCCOLI EXOSOMES AS ACTIVE INGREDIENT AND FUNCTIONAL COSMETICS COMPRISING SAME

(71) Applicants: EXOSTEMTECH CO., LTD., Ansan-si (KR); INDUSTRY-UNIVERSITY COOPERATION FOUNDATION HANYANG UNIVERSITY ERICA CAMPUS, Ansan-si (KR)

(72) Inventors: Yong Woo Cho, Seongnam-si (KR); Ji Suk Choi, Siheung-si (KR); Young Chan Choi, Chuncheon-si (KR); Seung Hee Cho, Ansan-si (KR); So Hee Min, Hwaseong-si (KR)

(73) Assignees: EXOSTEMTECH CO., LTD., Ansan-si (KR); INDUSTRY-UNIVERSITY COOPERATION FOUNDATION HANYANG UNIVERSITY ERICA CAMPUS, Ansan-si. (KR)

( * ) Notice: Subject to any disclaimer, the term of this patent is extended or adjusted under 35 U.S.C. 154(b) by 376 days.

(21) Appl. No.: 18/040,780

(22) PCT Filed: Aug. 6, 2021

(86) PCT No.: PCT/KR2021/010439
§ 371 (c)(1),
(2) Date: Feb. 6, 2023

(87) PCT Pub. No.: WO2022/031124
PCT Pub. Date: Feb. 10, 2022

(65) Prior Publication Data
US 2024/0024224 A1   Jan. 25, 2024

(30) Foreign Application Priority Data
Aug. 7, 2020 (KR) .......... 10-2020-0099518

(51) Int. Cl.
*A61K 8/9783*  (2017.01)
*A61Q 19/08*   (2006.01)

(52) U.S. Cl.
CPC .......... *A61K 8/9783* (2017.08); *A61Q 19/08* (2013.01); *A61K 2800/80* (2013.01)

(58) Field of Classification Search
CPC ....... A61K 36/31; A61K 8/14; A61K 2800/80
See application file for complete search history.

(56) References Cited

U.S. PATENT DOCUMENTS

| | | | |
|---|---|---|---|
| 11,529,370 | B2 | 12/2022 | Yi et al. |
| 2014/0161874 | A1* | 6/2014 | Carvajal Alcaraz ......................... A61Q 19/007 424/755 |
| 2020/0046788 | A1 | 2/2020 | Zhang |
| 2022/0364051 | A1* | 11/2022 | Cho ..................... B01D 61/145 |

FOREIGN PATENT DOCUMENTS

| | | |
|---|---|---|
| CN | 111432799 A | 7/2020 |
| EP | 2 716 280 A1 | 4/2014 |
| EP | 3 354 257 A1 | 8/2018 |
| JP | 2009-114152 A | 5/2009 |
| JP | 2019-156743 A | 9/2019 |
| KR | 10-2008-0060380 A | 7/2008 |
| KR | 10-2014-0022601 A | 2/2014 |
| KR | 10-2017-0114773 A | 10/2017 |
| KR | 10-2125567 B1 | 6/2020 |
| KR | 2125567 B1 * | 6/2020 ........... B01D 61/145 |
| WO | WO-2018098247 A1 * | 5/2018 ............. A61K 31/12 |

OTHER PUBLICATIONS

Healthline (The 11 Best Foods for Healthy Skin, Oct. 2024, https://www.healthline.com/nutrition/12-foods-for-healthy-skin)(Year: 2024).*
Shin et al (Frontiers in Physiology, 2023, doi: 10.3389/fphys.2023. 1195272) (Year: 2023).*
Kocholata et al (Physiological Research, 2022, vol. 71, pp. 327-339) (Year: 2022).*
Lucia Yepes-Molina et al., "Plant plasma membrane vesicles interaction with keratinocytes reveals their potential as carriers," Journal of Advanced Research, Feb. 8, 2020, pp. 101-111, vol. 23.
The Extended European Search Report for European Patent Application No. 21853851.0, dated Nov. 11, 2024.
Notification of Intention to Grant Patent for Invention for Chinese Patent Application No. 202180057063.9, dated Jul. 2, 2025.

* cited by examiner

*Primary Examiner* — Mark V Stevens

(57) ABSTRACT

The present disclosure relates to a functional cosmetic composition using broccoli exosomes as an active ingredient and a functional cosmetic product containing the same. The broccoli exosomes have a lipid bilayer structure and are well absorbed into skin cells, and the absorbed broccoli exosomes remove reactive oxygen within skin cells and stimulate anti-oxidant signaling mechanisms, so they show antioxidant efficacy, and promote hyaluronic acid synthesis, and thus, they can be useful for preparation of functional cosmetics for skin aging prevention, skin whitening, wrinkle improvement and skin cell regeneration.

8 Claims, 7 Drawing Sheets

ANTI-AGING AND ANTIOXIDANT COSMETIC COMPOSITION CONTAINING BROCCOLI EXOSOMES AS ACTIVE INGREDIENT AND FUNCTIONAL COSMETICS COMPRISING SAME

CROSS REFERENCE TO RELATED APPLICATIONS

The present application is a National Phase of International Application No. PCT/KR2021/010439 filed on Aug. 6, 2021, which claims the priority based on Korean Patent Application No. 10-2020-0099518 filed on Aug. 7, 2020, and the entire contents disclosed in the description and drawings of the corresponding application are referenced in the present application.

DETAILED DESCRIPTION OF THE INVENTION

Technical Field

The present disclosure relates to a cosmetic composition for anti-aging, anti-oxidation and anti-inflammation and a functional cosmetic comprising the same.

BACKGROUND ART

There are many causes of skin aging, and in particular, reactive oxygen generated through ultraviolet rays and breathing is considered the most important cause of skin aging. Reactive oxygen is generated during a normal metabolic process, and is generated in excess when a disease state or body stress is high. In addition, when exposed to ultraviolet rays, reactive oxygen is generated. Reactive oxygen leads skin cell and tissue damage. In a normal case, it kills abnormal and aged cells to create a balance, but when generated excessively, it destroys the skin anti-oxidant defense network, destroys lipid peroxidation, protein oxidation and matrix components, and destroys skin protein such as collagen, elastin and the like, and as a result, it leads to skin aging such as elasticity loss, wrinkles, pigmentation and the like.

Skin protein, including connective tissue of a dermal layer, plays an important role in maintaining elasticity and moisture of skin, and this can be attributed to protein essential for cell construction and production. Recently, there is a study result that proves a positive correlation between protein intake and skin moisture increase, and it can be inferred that high-quality protein intake is closely related to skin health from a nutritional point of view. However, the effect of protein intake through food on skin is only insignificant.

About 500 or more kinds of plant extracts with specific pharmacological activities such as anti-oxidation, anti-aging and the like are known in Korea, but most of them have not been verified for their effect on skin, and numerous ingredients exist in various ratios in the plant extracts, so finding an active substance with some effect is a difficult process. In addition, an active substance exhibiting an effect among plant components may act alone as one component, but the effect may appear only through interaction of several components. Moreover, it is known that various conventional plant extracts are difficult to pass through the skin barrier, and the effect is limited only by applying them to skin.

Numerous documents are referenced throughout the present description and citations thereof are indicated. The disclosure contents of the cited documents are incorporated in the present description by reference in their entirety to more clearly describe the level of the technical field to which the present disclosure pertains and the content of the present disclosure.

DISCLOSURE

Technical Problem

The present disclosure relates to anti-aging, anti-oxidant and anti-inflammatory efficacy of exosomes isolated purified from broccoli, and an object of the present disclosure is to provide a cosmetic composition using broccoli exosomes having anti-aging, anti-oxidant and anti-inflammatory functions as an active ingredient.

Another object of the present disclosure is to provide a functional cosmetic of skin protection, wrinkle improvement and skin whitening and the like, which is prepared by using the composition as a cosmetic raw material.

Other object of the present disclosure is to provide a method for skin anti-oxidation, comprising applying a cosmetic composition comprising broccoli exosomes into a subject.

Other object of the present disclosure is to provide a cosmetic use for skin anti-oxidation of a cosmetic composition comprising broccoli exosomes.

Other object of the present disclosure is to provide a cosmetic use for skin whitening, wrinkle improvement and skin cell regeneration of a cosmetic composition comprising broccoli exosomes.

More specifically, an object of the present disclosure is to provide the following embodiments.

Embodiment 1. A composition or cosmetic composition comprising broccoli exosomes; A method for skin aging prevention, skin anti-oxidation, skin whitening, skin wrinkle improvement, skin cell regeneration, skin moisturization, skin barrier improvement or skin anti-inflammation, comprising applying a composition comprising broccoli exosomes or comprising applying isolated broccoli exosomes to a subject in need thereof, A use or a cosmetic use of isolated broccoli exosomes or a composition comprising broccoli exosomes, for exhibiting cosmetic efficacy selected from skin aging prevention, skin anti-oxidation, skin whitening, skin wrinkle improvement, skin cell regeneration, skin moisturization, skin barrier improvement and skin anti-inflammation; or A use of a composition comprising broccoli exosomes or a use of isolated broccoli exosomes for preparation of a cosmetic product for skin aging prevention, skin anti-oxidation, skin whitening, skin wrinkle improvement, skin cell regeneration, moisturizing, skin barrier improvement or skin anti-inflammation.

Embodiment 2. The composition; method; or use or a cosmetic use according to Embodiment 1, wherein the broccoli exosomes are derived from at least one selected from the group consisting of broccoli flowers, broccoli stems and broccoli sprouts.

Embodiment 3. The composition; method; or use or a cosmetic use according to any one of the preceding embodiments, wherein the broccoli exosomes are comprised in an amount of $10^6$ to $10^{13}$ particles per 1 mL of the composition.

Embodiment 4. The composition; method; or use or a cosmetic use according to any one of the preceding embodiments, wherein the composition is a formulation selected from the group consisting of aqueous solution, suspension, emulsion, cream, freezing solution, spray-dried powder and freeze-dried powder.

Embodiment 5. The composition; method; or use or a cosmetic use according to any one of the preceding embodiments, wherein the broccoli exosomes comprise polyphenol.

Embodiment 6. The composition; method; or use or a cosmetic use according to any one of the preceding embodiments, wherein the cosmetic composition has an anti-aging or anti-oxidant use.

Embodiment 7. A cosmetic comprising the composition according to any one of the preceding embodiments.

Embodiment 8. The cosmetic according to any one of the preceding embodiments, wherein the cosmetic is a formulation selected from the group consisting of mist, serum, nourishing cosmetic water, soft cosmetic water, soft water, emulsion, skin lotion, skin softener, skin toner, astringent, lotion, milk lotion, moisture lotion, nourishing lotion, massage cream, nourishing cream, moisture cream, hand cream, foundation, powder, makeup base, essence, nourishing essence, packs, soap, cleansing foam, cleansing lotion, cleansing cream, body lotion, body cleanser, face wash, treatment, cosmetic liquid, cosmetic packs, ointment, gel, liniment, liquid, patches, spray, bath preparations, sunscreens, sun oil and hair products.

Embodiment 9. The cosmetic according to any one of the preceding embodiments, wherein the cosmetic is a functional cosmetic product having at least on efficacy selected from the group consisting of skin aging prevention, skin whitening, wrinkle improvement, skin cell regeneration, moisturizing, skin barrier improvement and anti-inflammation.

Embodiment 10. A method of preparing the composition or cosmetic composition according to any one of the preceding embodiments, comprising crushing broccoli; performing centrifugation; and performing tangential-flow filtration (TFF).

Other objects and advantages of the present disclosure will become more apparent from the following detailed description of the invention, claims and drawings.

Technical Solution

One aspect of the present disclosure is to provide a cosmetic composition comprising broccoli sprout exosomes as an active ingredient.

The term used in the present disclosure, "broccoli exosome" collectively refers to an exosome or an extracellular endoplasmic reticulum comprising an exosome having a size of 50~300 nm, preferably, a size of 50~200 nm which is extracted from broccoli. The broccoli exosome forms particles with a uniform size of 50 to 200 nm in a lipid bilayer form.

Various conventional plant extracts are known to comprise anti-aging and anti-oxidant substances, but there is a problem in that it is difficult to pass through the skin barrier in a form of a water-soluble extract, and the active ingredient is easily destroyed by exposure to an extraction solvent during an extraction process, so it is difficult to apply to a cosmetic raw material. On the other hand, the exosome is a nanoparticle composed of a lipid bilayer, and is absorbed into skin cells by receptor-mediated endocytosis and membrane fusion, and in addition, it is very advantageous for commercial use in the cosmetic industry because active ingredients comprised inside are not directly exposed to the outside, so they are not easily deteriorated and can maintain biological activity for a long period of time.

In the present disclosure, the broccoli exosome has a function of inhibiting reactive oxygen which causes skin aging, pigmentation and inflammation, by anti-aging and anti-oxidant components derived from broccoli which is a raw material comprising broccoli sprouts, and thus it has anti-aging and/or anti-oxidant uses. Specifically, the broccoli exosome containing polyphenol and anti-oxidant enzyme promoter and the like inhibits accumulated reactive oxygen, so it exhibits efficacy of skin regeneration, wrinkle improvement, whitening and inflammation relief, and the like.

The raw material plant of the prevent invention, broccoli includes *Brassica oleracea* (*Brassica oleracea* L.) which is one kind of the genus of *Brassica*. As a raw material plant part, whole broccoli or at least one part including flowers, stems, sprouts and the like may be mixed and used.

In the present disclosure, the broccoli/broccoli sprout exosome extracted from broccoli/broccoli sprouts may be comprised in a content of $1\times10^6$ to $1\times10^{13}$, preferably, $1\times10^7$ to $1\times10^{13}$ particles per unit volume of the composition 1 mL.

The broccoli/broccoli sprout exosome itself has anti-aging and anti-oxidant functions similar to Superoxide dismutase (SOD), and this promotes decomposition of reactive oxygen existing outside cells and reactive oxygen accumulated inside the cells, and exhibits efficacy of promotion of collagen production, promotion of hyaluronic acid production and inhibition of melanin synthesis, and inhibition of inflammatory substance production, and the like.

In addition, supply of high-quality protein is closely related to skin moisture increase and skin health, and the broccoli exosomes of the present disclosure can effectively deliver plant protein to skin by containing protein at a high concentration of 10 to 1,000 µg/mL, preferably, 100 to 1,000 µg/mL.

In one embodiment, the cosmetic composition for anti-oxidation comprising the broccoli/broccoli sprout exosome as an active ingredient may be provided in a formulation selected from the group consisting of aqueous solution, suspension, emulsion, cream, freezing solution, spray-dried powder and freeze-dried powder.

Another aspect of the present disclosure is to provide a cosmetic comprising a cosmetic composition for anti-oxidation comprising broccoli/broccoli sprout exosomes as an active ingredient.

The cosmetic may be applied and mixed with a general component used in preparation of general skin cosmetics, for example, oil, water, surfactants, moisturizers, lower alcohols, thickeners, chelating agents, pigments, preservatives, flavorings, and the like as much as needed. In addition, the cosmetic may be prepared in a formulation selected from the group consisting of mist, serum, nourishing cosmetic water, soft cosmetic water, soft water, emulsion, skin lotion, skin softener, skin toner, astringent, lotion, milk lotion, moisture lotion, nourishing lotion, massage cream, nourishing cream, moisture cream, hand cream, foundation, powder, makeup base, essence, nourishing essence, packs, soap, cleansing foam, cleansing lotion, cleansing cream, body lotion, body cleanser, face wash, treatment, cosmetic liquid, cosmetic packs, ointment, gel, liniment, liquid, patches, spray, bath preparations, sunscreens, sun oil and hair products, and it may comprise various kinds of conventional carriers and additives suitable for each formulation thereof and well known in the art.

Such a cosmetic of the present disclosure may be a functional cosmetic having at least one efficacy selected from the group consisting of skin aging prevention, skin whitening, wrinkle improvement and skin cell regeneration.

Other aspect of the present disclosure is to provide a preparation method of the cosmetic composition for anti-aging and anti-oxidation comprising the broccoli/broccoli sprout exosome as an active ingredient, which comprises crushing broccoli; performing centrifugation; and performing tangential-flow filtration (TFF).

The process of crushing the raw material plant may comprise a process of mechanically crushing a mixture in which the raw material and buffer solution are mixed in a range of 1:1 to 1:10 in a weight ratio, and this may be performed by mechanically crushing a plant mixture by a rotating blade at a speed of 10 to 1,000 rpm.

The centrifugation method may be selected from low-speed centrifugation, high-speed centrifugation, ultracentrifugation and combinations thereof, and preferably, it may include ultracentrifugation. The low-speed centrifugation can achieve a speed of 6,000 rpm (6,000×g) or less, and is mainly used for centrifugation of samples that are easily precipitated such as cells or nuclei or the like, and the high-speed centrifugation has a maximum speed of about 20,000-25,000 rpm (60,000×g), and the ultracentrifugation means a centrifugation method with a maximum speed of about 40,000-80,000 rpm (600,000×g).

The tangential-flow filtration (TFF) is a filtration method in which a solution flows in a direction perpendicular to a filtration membrane, filtering out small-sized impurities present in the solution, and separating large-sized exosomes. It can minimize adsorption of exosomes to pores of a filtration filter or clogging of membrane pores compared to the conventional filtration method, and accordingly, it is easy to apply process scale-up and cGMP (cosmetic good manufacturing procedure) process. The tangential-flow filtration may be at least one selected from the group consisting of hollow fiber TFF and membrane TFF capable of performing ultrafiltration, and preferably, it may use a TFF filter of which molecular weight cutoff (MWCO) is 100,000 Da to 500,000 Da.

As such, the broccoli/broccoli sprout exosomes according to the present disclosure may be separated from broccoli and broccoli sprouts through mechanical crushing, stepwise ultracentrifugation and tangential flow filtration (TFF) methods, and these exosomes contain a large amount of polyphenol having anti-aging and anti-oxidant functions.

Advantageous Effects

Broccoli exosomes have a lipid bilayer structure and are absorbed into skin cells, and the polyphenol components of the absorbed broccoli exosomes remove reactive oxygen within skin cells and stimulate anti-oxidant signaling mechanisms, so they have various functional cosmetic uses such as skin whitening, wrinkle improvement, skin aging prevention, skin barrier improvement, inflammation relief, skin cell activation and the like. In addition, the excellent stability of the broccoli exosomes can be utilized in various types such as aqueous solution, freezing solution and freeze-dried powder, and the like for functional cosmetics.

MODE FOR INVENTION

Hereinafter, the present disclosure will be described in more detail by examples. These examples are intended to illustrate the present disclosure more specifically only, and it will be obvious to those skilled in the art to which the present disclosure pertains that the scope of the present disclosure is not limited by these examples.

EXAMPLE

<Example 1> Plant Exosome Separation

Figure 1:
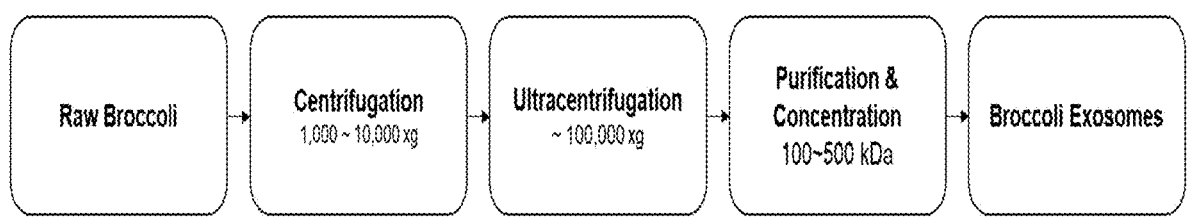
FIG. 1 is a schematic diagram of the process of the method for isolating plant exosomes.

As raw materials, using broccoli and broccoli sprouts, aloe vera peels and spinach, plant exosomes were isolated therefrom using ultracentrifugation and tangential flow filtration (TFF) methods. Specifically, the cleanly washed plant materials were crushed and homogenized by using a blender in a weight ratio of 1:1 (w/w) to 1:10 (w/w) with phosphate-buffered saline (PBS). The supernatant was collected by centrifugation at 1,000×g for 10 minutes, and the supernatant was centrifugated sequentially at 2000×g for 20 minutes, at 3,000×g for 30 minutes, and at 10,000×g for 60 minutes. Then, the supernatant was ultracentrifuged at 4° C. at 100,000×g for 70 minutes, and through this process, vacuoles were removed. Finally, the supernatant was discarded, and the remaining pellet was suspended, and the exosomes were purified through the TFF system. Specifically, the exosomes were purified by using a filter having a molecular cut off of 100 to 500 kDa in the TFF system, and other impurity particles smaller than pores of the filter were removed and the solution containing the exosomes was concentrated. The separated exosomes were stored frozen at −70° C. or less until use (FIG. 1).

<Example 2> Exosome Protein Content Evaluation

The protein content comprised in the broccoli sprout exosomes, aloe exosome and spinach exosomes was measured using Micro BCA™ Protein Assay Kit of Thermo Scientific company. Two groups of exosomes were used for comparative study, one is the exosome samples immediately after isolation and the other one is the exosome sample stored at least −70° C. for one month. Specifically, using a pipette, each standard and sample 1.0 mL were out in a test tube, and WR 1.0 mL was added to each tube, and then mixed. The tube was covered and incubated in a water bath at 37° C. for 30 minutes and then cooling was conducted at a room temperature. The instrument was zeroed in a cuvette filled with distilled water with a spectrophotometer set to 562 nm, and the absorbance of the samples was measured within 10 minutes. A standard curve was prepared by measuring total protein concentration versus protein standard and plotting average blank corrected 562 nm reading values for each standard. Using the standard curve, the protein content of the samples was measured and the result was shown in Table 1 below.

TABLE 1

| | Sample | Protein content |
|---|---|---|
| First measurement (immediately after exosome separation) | Broccoli sprout exosome | 983.32 μg/mL |
| | Aloe exosome | 299.19 μg/mL |
| | Spinach exosome | 542.74 μg/mL |
| Second measurement (after thawing) | Broccoli sprout exosome | 102.59 μg/mL |
| | Aloe exosome | 50.21 μg/mL |
| | Spinach exosome | 52.35 μg/mL |

As a result of the experiment, it was confirmed that the broccoli sprout exosomes contained protein of 100 μg/mL or more per unit volume of 1 mL even after thawing. Further characteristic evaluation was performed using the broccoli sprout exosome which was confirmed as having a high protein content.

<Example 3> Characteristic Evaluation of Broccoli Sprout Exosome

Figure 2:
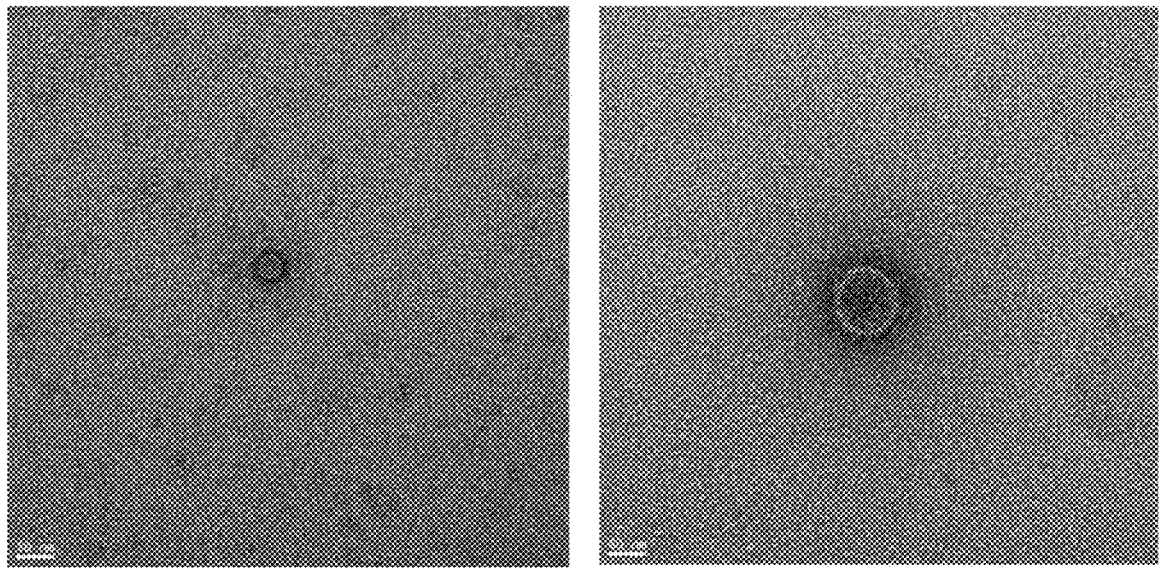
FIG. 2 is the result of morphology analysis (TEM) of broccoli sprout exosomes.
Figure 3:
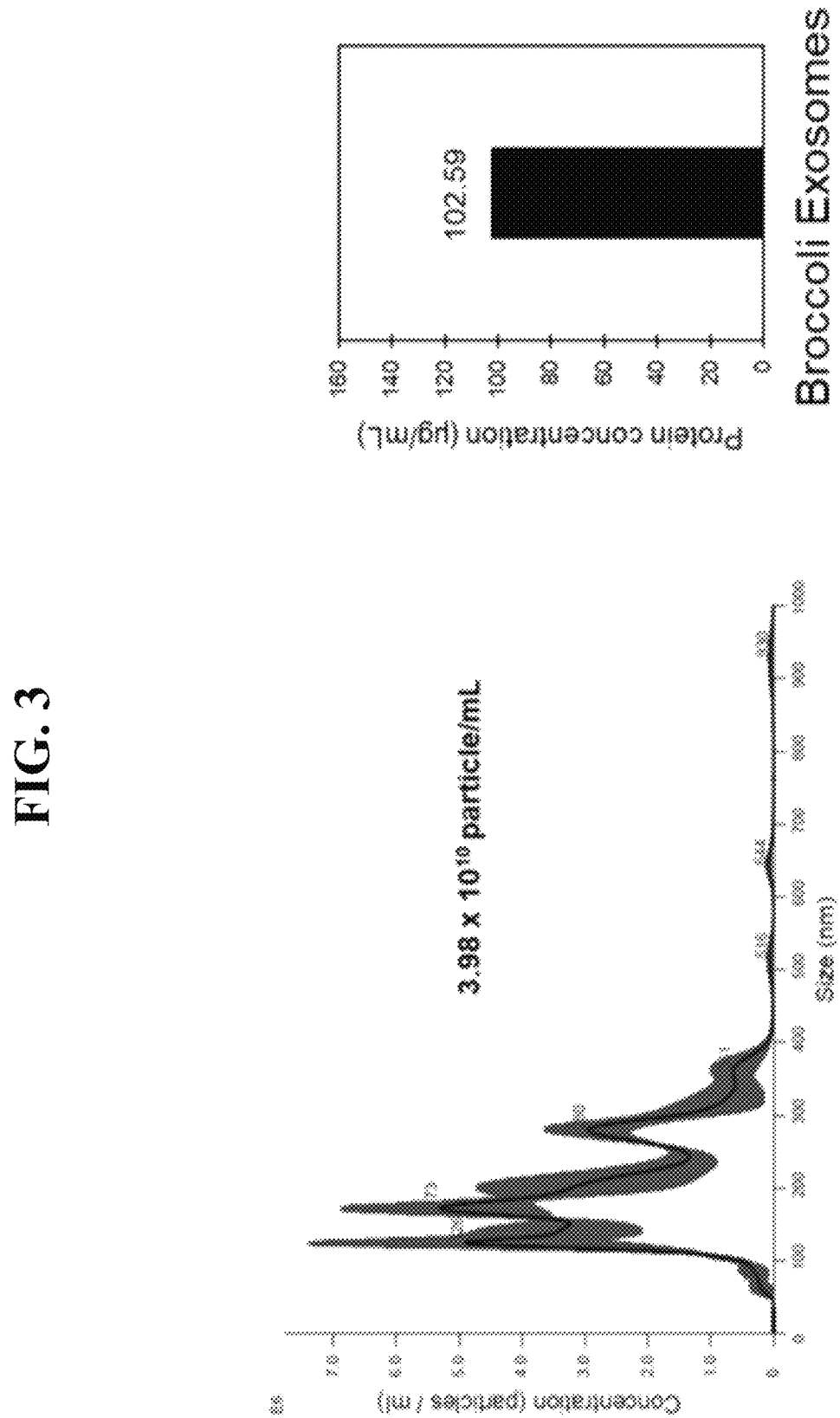
FIG. 3 is the result of characteristic analysis (NTA and protein assay) of broccoli sprout exosomes.

For the broccoli sprout exosome isolated in Example 1, further exosome characteristic evaluation was conducted through the following method. As the shape of the exosome, a spherical microstructure of 200 nm or less was confirmed through a scanning electron microscope (TEM) (scale bar 50 nm) (FIG. 2). The microparticle size was analyzed through nanoparticle tracking analysis (NTA), and it was confirmed that it had a size of 50 to 300 nm (FIG. 3). Through nanoparticle tracking analysis (NTA), the exosome concentration of $1\times10^8$ to $1\times10^{13}$ per unit volume of 1 mL was confirmed (FIG. 3). The protein content in the exosome was further measured several times using Micro BCA™ Protein Assay Kit of Thermo Scientific company, and it was confirmed that it contained protein of 10 to 1,000 μg/mL per unit volume of 1 mL (FIG. 3).

<Example 4> Evaluation of Polyphenol Content of Broccoli Sprout Exosome

Figure 4:
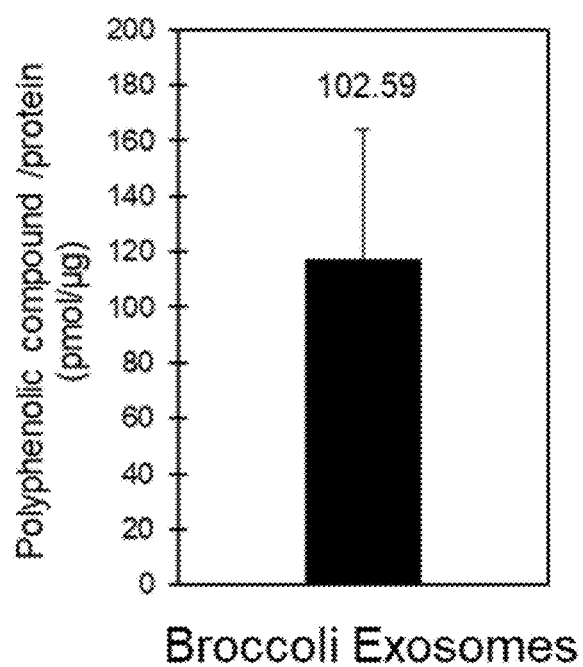
FIG. 4 is the result of analysis of the polyphenol content and copper reducing ability of broccoli sprout exosomes.
Figure 4:
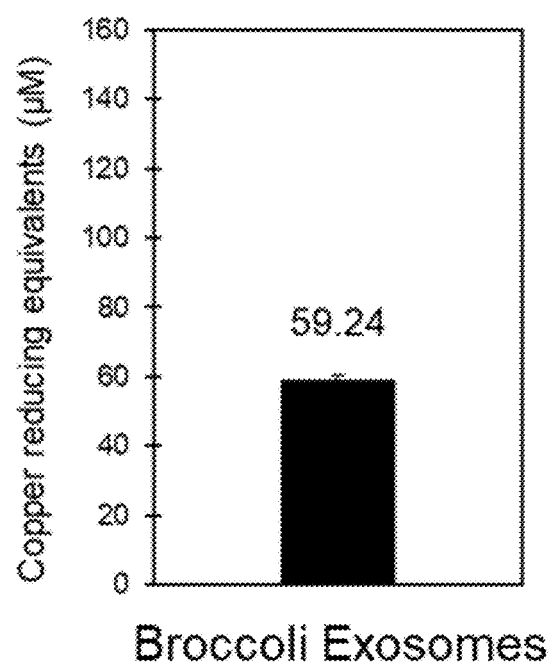

For the broccoli sprout exosome isolated in Example 1, the polyphenol content in the exosome was evaluated through the following method. The polyphenol content in the broccoli exosome was measured using Phenolic Compounds Assay Kit of BioVision company, and the measurement method was performed according to the Kit manufacturer's protocol. It was confirmed that polyphenol of 50 to 500 pmol was contained inside the broccoli exosomes of $10^8$ (FIG. 4).

<Example 5> Evaluation of Anti-Oxidant Activity of Broccoli Sprout Exosome

For the broccoli sprout exosome isolated in Example 1, the polyphenol content in the exosome was evaluated through the following method. The anti-oxidant ability of the broccoli exosomes was evaluated using OxiSelect™ Total Antioxidant Capacity (TAC) Assay Kit of CELL BIOLABS inc. company, and the measurement method was performed according to the kit manufacturer's protocol. As a result of the evaluation, it was confirmed that the broccoli sprout exosome had ability to reduce Cu(II) ions of 10 to 100 μM per unit volume of 1 mL into Cu(I) ions (FIG. 4).

<Example 6> Evaluation of In Vitro Whitening Efficacy of Broccoli Sprout Exosome In order to evaluate the anti-oxidant efficacy of the broccoli sprout exosome isolated in Example 1, evaluation of whitening efficacy of the exosome was representatively carried out. Skin melanoma (B16F10) cells of $5\times10^3$ to $1\times10^4$ were treated with the sample comprising the broccoli exosomes, and after culturing for 3 days, the intracellular and extracellular melanin contents were measured. To determine the intracellular melanin contents, the absorbance of the solution at 475 nm was measured using a UV-visible spectrophotometer after destroying and lysing the cells. For the extracellular melanin, after collecting the cell culture solution cultured for 3 days, the absorbance of the solution at 490 nm was measured using a UV-visible spectrophotometer. As a negative control group, a growth medium (GM) without the exosomes was used, and as a positive control group, 0.5 mM arbutin which is widely used for whitening efficacy evaluation was used.

Figure 5:
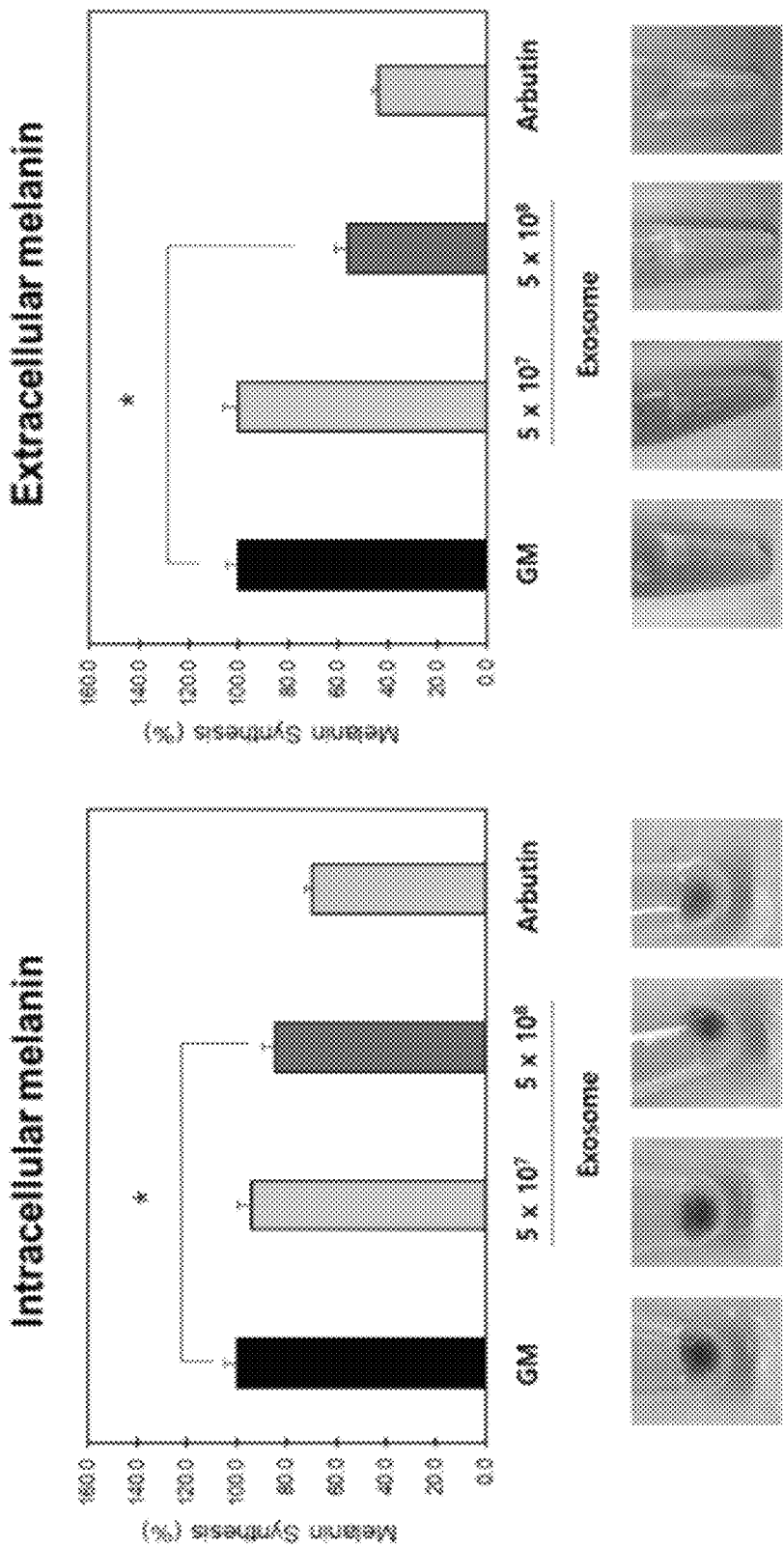
FIG. 5 is the result of evaluation of melanin formation inhibitory ability of broccoli sprout exosomes.

It was confirmed that the broccoli sprout exosome inhibited extracellular and intracellular melanin formation at a capacity of $5\times10^7$ or more, and in particular, when $5\times10^8$ was treated, there was a significant effect on inhibition of melanin formation (p<0.05) (FIG. 5).

Figure 6:
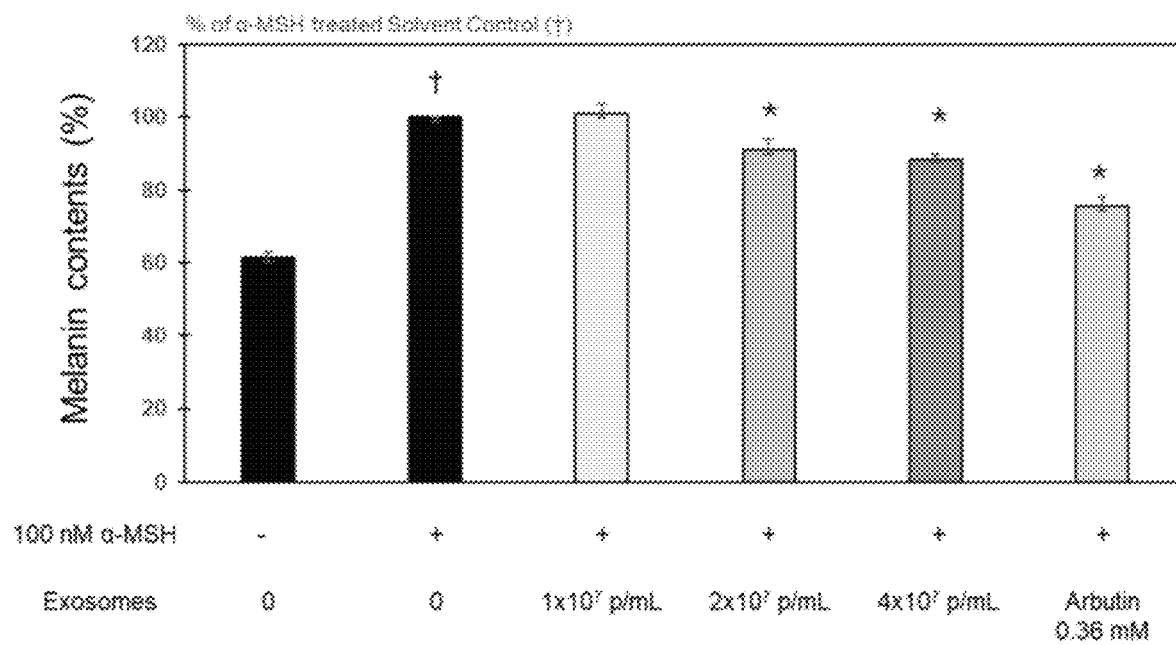
FIG. 6 is the result of evaluation of melanin formation inhibitory ability in a cell model in which melanin formation is promoted by a-MSH of broccoli sprout exosomes.

For the whitening efficacy of the broccoli sprout exosome separated in Example 1, evaluation was further conducted using a model in which skin melanoma (B16F10) cells were treated with 100 nM α-MSH to promote melanin synthesis and secretion. After treating the cell culture solution comprising the α-MSH and broccoli exosomes, it was cultured for 3 days, and the total contents of intracellular and extracellular melanin were measured using a UV-visible spectrophotometer. For protein content measurement, after quantifying it according to Bradford method, the melanin amount was converted into the melanin amount per protein. As a negative control group, a cell culture medium without treating the exosome was used, and as a positive control group, 0.36 mM arbutin which is widely used for whitening efficacy evaluation was used. The broccoli sprout exosome inhibited the total melanin formation at a capacity of $2\times10^7$ or more (p<0.05) (FIG. 6).

Figure 7:
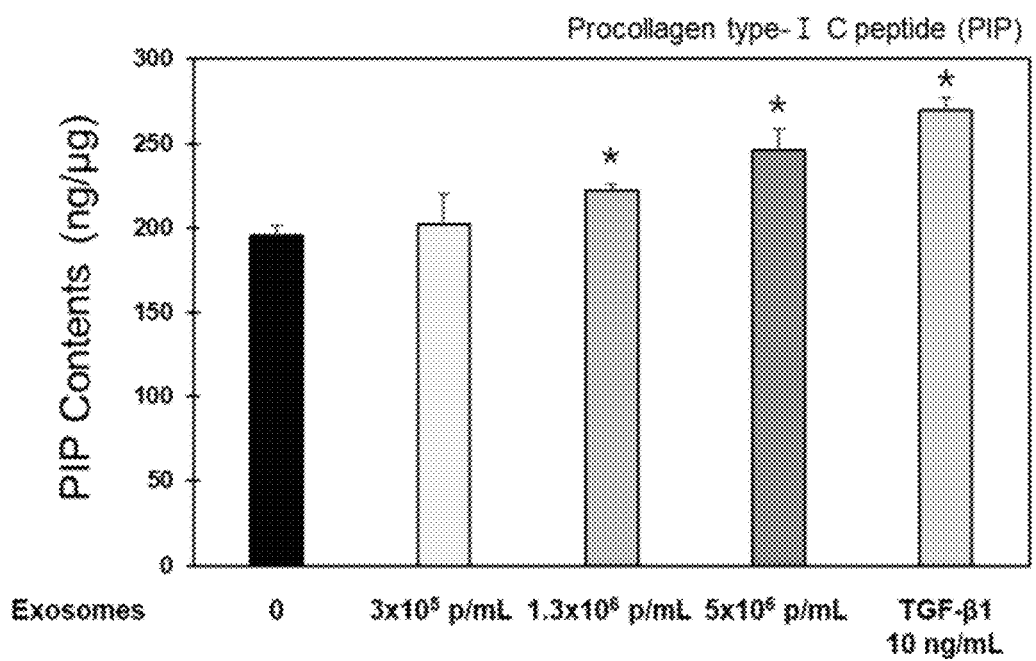
FIG. 7 is the result of evaluation of collagen producing ability of broccoli sprout exosomes.

<Example 7> Evaluation of In Vitro Collagen Formation of Broccoli Sprout Exosome In order to evaluate the efficacy on collagen formation of the broccoli sprout exosome separated in Example 1, the exosome was treated to human dermal fibroblasts (HDFs) to confirm the amount of produced intracellular collagen. The cell culture solution comprising the broccoli exosomes was treated to the HDFs cells, and after culturing them for 2 days, the amount of procollagen was measured using the supernatant by centrifugation. For the amount of procollagen, the absorbance at 450 nm was measured using Procollagen Type I C-Peptide (PIP) ELISA Kit. As a negative control group, the cell culture solution without any treatment (GM) was used, and as a positive control group, TGF-β1 which is known to induce collagen production was used. It was confirmed that the broccoli sprout exosome had a significant effect on increasing intracellular collagen production compared to the negative control group at a concentration of $1.3\times10^6$ to $1\times10^7$ (p<0.05) (FIG. 7). This has efficacy similar to the positive control group, TGF-β1.

Figure 8:
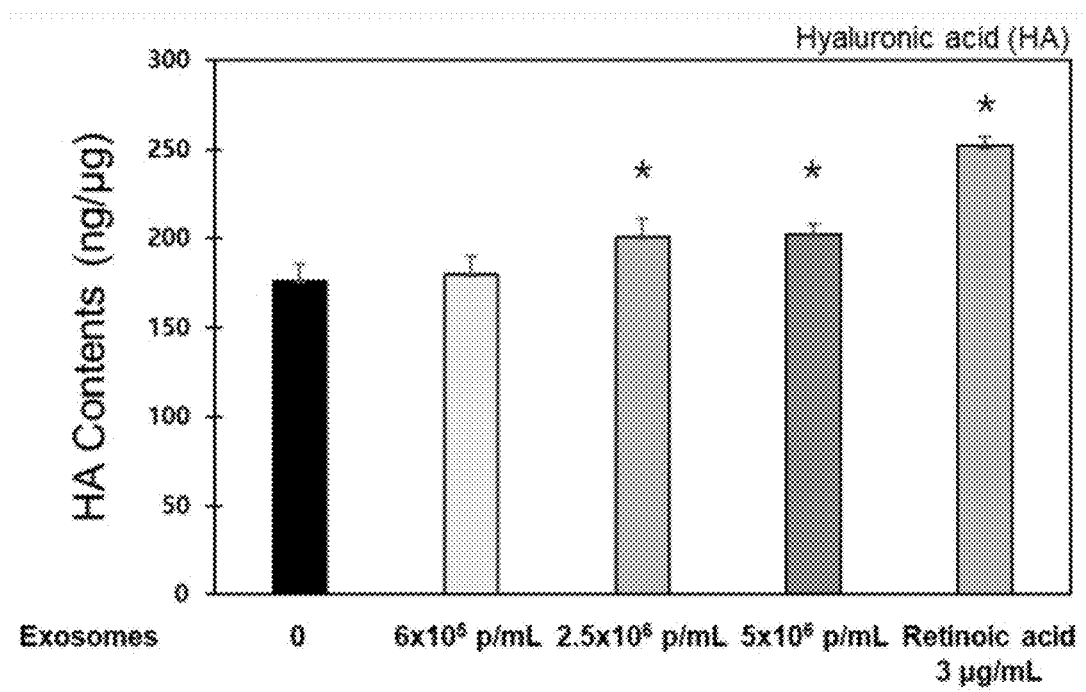
FIG. 8 is the result of evaluation of hyaluronic acid producing ability of broccoli sprout exosomes.

<Example 8> Evaluation of In Vitro Hyaluronic Acid Production of Broccoli Sprout Exosome In order to evaluate the efficacy on hyaluronic acid production of the broccoli sprout exosome isolated in Example 1, the exosome was treated to human dermal fibroblasts (HDFs) to confirm the amount of produced intracellular hyaluronic acid. The sample comprising the broccoli sprout exosomes was treated to the HDFs, and after culturing them for 2 days, the supernatants were collected by centrifugation and used as the test samples to measure the amount of produced hyaluronic acids. For determination of the amount of produced hyaluronic acid, the absorbance at 450 nm was measured using Human Hyaluronic Acid (HA) ELISA Kit. As a negative control group, the growth media without exosomes (GM) was used, and as a positive control group, retinoic acid which is used to promote hyaluronic acid production was used. It was confirmed that the broccoli sprout exosome had a significant effect on increasing intracellular hyaluronic acid production compared to the negative control group at a concentration of $2.5 \times 10^6$ to $1 \times 10^7$ ($p<0.05$) (FIG. 8). This has efficacy similar to the positive control group, retinoic acid.

<Example 9> Evaluation of In Vitro Nitric Oxide Production of Broccoli Sprout Exosome In order to evaluate the efficacy of inhibiting Nitric Oxide (NO) production of the broccoli sprout exosome isolated in Example 1, the exosome was treated to mouse macrophages (RAW 264.7 cells) to confirm whether it inhibits NO production. After culturing the RAW 264.7 cells of $1.8 \times 10^5$, it was exchanged with a new cell culture solution comprising lipopolysaccharide (LPS) 1 µg/mL and the broccoli sprout exosomes, and then it was cultured for 24 hours. In 24 hours, the culture solution and an NO detection reagent were reacted for 10 minutes, and then the absorbance of the solution at 540 nm was measured. The amount of produced NO was evaluated by correcting the total protein amount, and as a positive control group, 7.8 µg/mL of dexamethasone, which has an effect of inflammation inhibition, was used.

Figure 9:
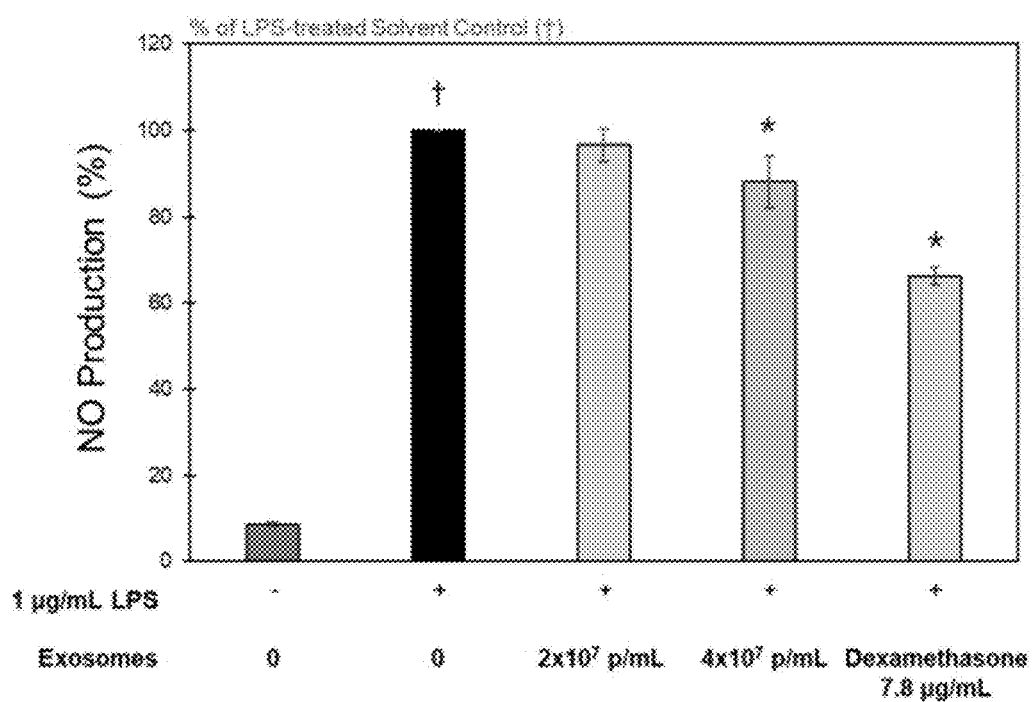
FIG. 9 is the result of evaluation of NO production inhibitory ability of broccoli sprout exosomes.

It was confirmed that the broccoli sprout exosome had efficacy to inhibit NO production at $2 \times 10^7$ or more ($p<0.05$) (FIG. 9). Preferably, it effectively inhibits NO production of cells in the exosomes of $2 \times 10^7$ to $4 \times 10^7$, and this has efficacy similar to the positive control group, dexamethasone.

<Example 10> Evaluation of Cytotoxicity of Broccoli Sprout Exosome

In order to confirm the cytotoxicity of the broccoli sprout exosome isolated in Example 1, after treating the exosome, the cell viability of 2 kinds of human cells and mouse macrophages was evaluated using MTT assay.

Figure 10:
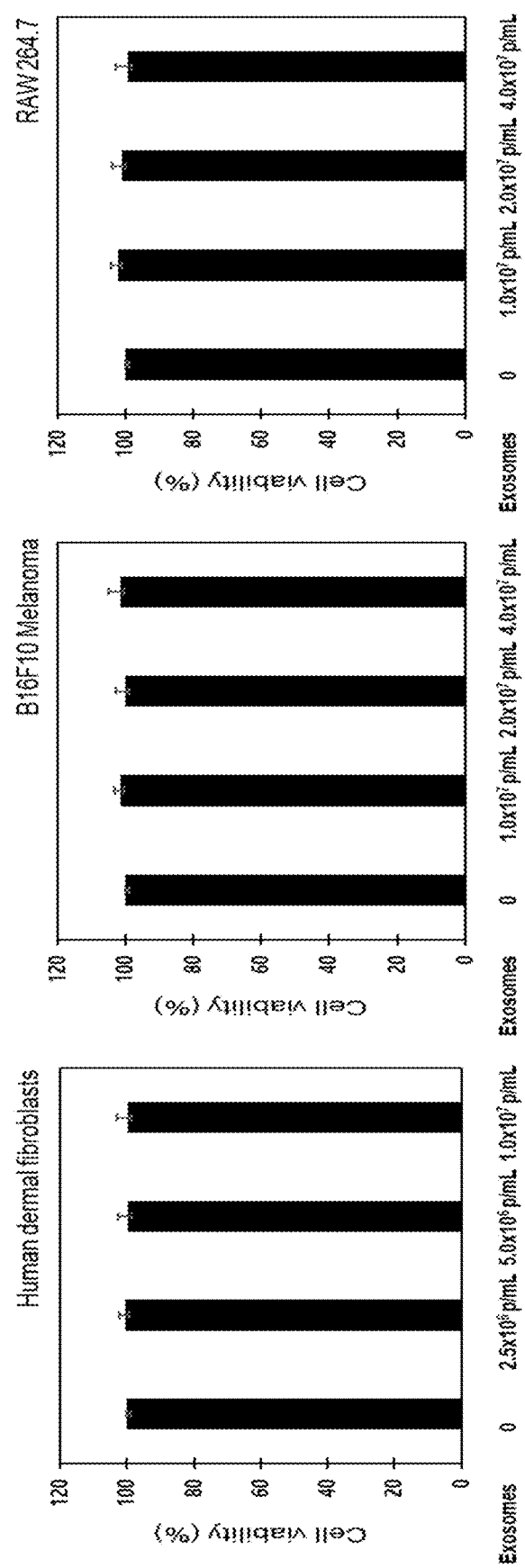
FIG. 10 is the result of evaluation of cytotoxicity of broccoli sprout exosomes on human fibroblasts (HDF), B16F10 Melanoma, and mouse macrophages (RAW 264.7).

After inoculating human fibroblasts at a concentration of $5 \times 10^4$ cells/well and culturing them for 24 hours, the broccoli sprout exosomes were treated and then they were further cultured for 24 hours. After inoculating B16F10 melanoma cells at a concentration of $1.5 \times 10^4$ cells/well and culturing them for 24 hours, the broccoli exosomes were treated and then they were cultured for 72 hours. After inoculating mouse macrophages (RAW 264.7) at a concentration of $1.8 \times 10^5$ cells/well and culturing them for 20 hours, the broccoli exosomes were treated and then they were cultured for 24 hours. An MMT reagent was treated to each well at a concentration of 0.05% of the cell culture medium, and then they were incubated for 4 hours. After removing the culture solution, DMSO was inoculated by 1 mL/well, and then it was stirred for 10 minutes, and then the DMSO solution was recovered to measure the absorbance at 540 nm. The cell viability was written as a percentage compared to the exosome untreated group (FIG. 10). As a result of the experiment, it was confirmed that the broccoli sprout exosome did not exhibit the cytotoxicity at all concentrations.

The invention claimed is:

1. A method of exhibiting a cosmetic effect on a subject in need thereof, comprising administering isolated broccoli exosomes isolated from broccoli sprouts to the subject,
   wherein the broccoli exosomes are comprised in a composition in an amount of $10^6$ to $10^{13}$ particles per 1 mL of the composition, and the administration of the broccoli exosomes is carried out by administering the composition to the subject,
   wherein the composition is formulated as one selected from the group consisting of an aqueous solution, a suspension, an emulsion, a cream, a freezing solution, a spray-dried powder and a freeze-dried powder.

2. The method according to claim 1, wherein the broccoli exosomes comprise polyphenol.

3. The method according to claim 1, wherein the broccoli exosomes have an anti-oxidant effect.

4. The method according to claim 1, wherein the composition is formulated into a cosmetic composition.

5. The method according to claim 4, wherein the cosmetic composition is a formulation selected from the group consisting of mist, serum, nourishing cosmetic water, soft cosmetic water, soft water, emulsion, skin lotion, skin softener, skin toner, astringent, lotion, milk lotion, moisture lotion, nourishing lotion, massage cream, nourishing cream, moisture cream, hand cream, foundation, powder, makeup base, essence, nourishing essence, packs, soap, cleansing foam, cleansing lotion, cleansing cream, body lotion, body cleanser, face wash, treatment, cosmetic liquid, cosmetic packs, ointment, gel, liniment, liquid, patches, spray, bath preparations, sunscreens, sun oil and hair products.

6. The method according to claim 1, wherein the cosmetic effect is at least one effect selected from the group consisting of skin whitening, wrinkle improvement, skin cell regeneration, skin moisturization, skin barrier improvement and anti-inflammation.

7. The method according to claim 4, wherein the cosmetic composition is prepared by a method, comprising:
   crushing broccoli sprouts;
   performing centrifugation; and
   performing tangential-flow filtration (TFF).

8. The method according to claim 1, wherein the cosmetic effect is skin whitening and/or hyaluronic acid production.

* * * * *